(12) United States Patent
Gilbert et al.

(10) Patent No.: US 7,974,943 B2
(45) Date of Patent: Jul. 5, 2011

(54) BUILDING A SYNCHRONIZED TARGET DATABASE

(75) Inventors: Gary M. Gilbert, Arlington Heights, IL (US); Sean L. Broeder, Sunnyvale, CA (US); Ronald P. Cohen, Hemet, CA (US); Leonard R. Fishler, Saratoga, CA (US); Gary S. Smith, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 12/261,055

(22) Filed: Oct. 30, 2008

(65) Prior Publication Data

US 2010/0114831 A1 May 6, 2010

(51) Int. Cl.
*G06F 17/30* (2006.01)

(52) U.S. Cl. ........ 707/610; 707/648; 707/615; 707/616; 707/626; 707/635; 707/636; 707/633; 707/634; 707/637; 707/638; 707/639

(58) Field of Classification Search .................. 707/648, 707/609–639
See application file for complete search history.

(56) References Cited

U.S. PATENT DOCUMENTS

| | | | | |
|---|---|---|---|---|
| 5,301,337 | A * | 4/1994 | Wells et al. | 718/104 |
| 5,708,812 | A * | 1/1998 | Van Dyke et al. | 717/171 |
| 6,122,630 | A * | 9/2000 | Strickler et al. | 1/1 |
| 6,745,209 | B2 * | 6/2004 | Holenstein et al. | 707/615 |
| 7,321,904 | B2 * | 1/2008 | Holenstein et al. | 1/1 |
| 7,802,068 | B2 * | 9/2010 | Madison et al. | 711/162 |
| 7,853,561 | B2 * | 12/2010 | Holenstein et al. | 707/611 |
| 7,882,062 | B2 * | 2/2011 | Holenstein et al. | 707/610 |
| 2002/0165945 | A1 * | 11/2002 | Buswell et al. | 709/221 |
| 2003/0093443 | A1 * | 5/2003 | Huxoll | 707/204 |
| 2004/0133591 | A1 * | 7/2004 | Holenstein et al. | 707/102 |
| 2008/0109496 | A1 * | 5/2008 | Holenstein et al. | 707/204 |
| 2008/0109497 | A1 * | 5/2008 | Holenstein et al. | 707/204 |
| 2008/0215593 | A1 * | 9/2008 | Holt | 707/10 |

\* cited by examiner

*Primary Examiner* — Frantz Coby

(57) ABSTRACT

One embodiment is a method that builds a target database with transaction logs from an online source database. The transaction logs include both existing data in the source database and updates that occur to the source database while the target database is being built.

16 Claims, 4 Drawing Sheets

BUILDING A SYNCHRONIZED TARGET DATABASE

BACKGROUND

Enterprises commonly maintain multiple copies of important data and expend large amounts of time and money to protect this data against losses due to disasters or catastrophes. One challenge is how to create a copy of an existing large database to a backup database.

To build a backup database, one conventional approach takes the primary or source database off-line (i.e., shuts it down) and then moves data from the primary database to the backup or target database. Another approach moves a copy of data from the primary database to the backup database and later updates the backup database with changes that occurred while the data was being copied and moved.

These conventional approaches are deficient. Some enterprises, such as financial institutions, airline industry, and others, would lose valuable time and money if the primary database were taken offline or shutdown. Simply copying and moving data are also problematic since these require significant storage for transactions logs that accumulate during the copying process. In large database systems, these transaction logs can grow beyond the storage capacity to be retained or grow to a size wherein updates cannot be applied in a timely manner. Basically the backup system falls behind and never catches up to the primary system.

DETAILED DESCRIPTION

Figure 1:
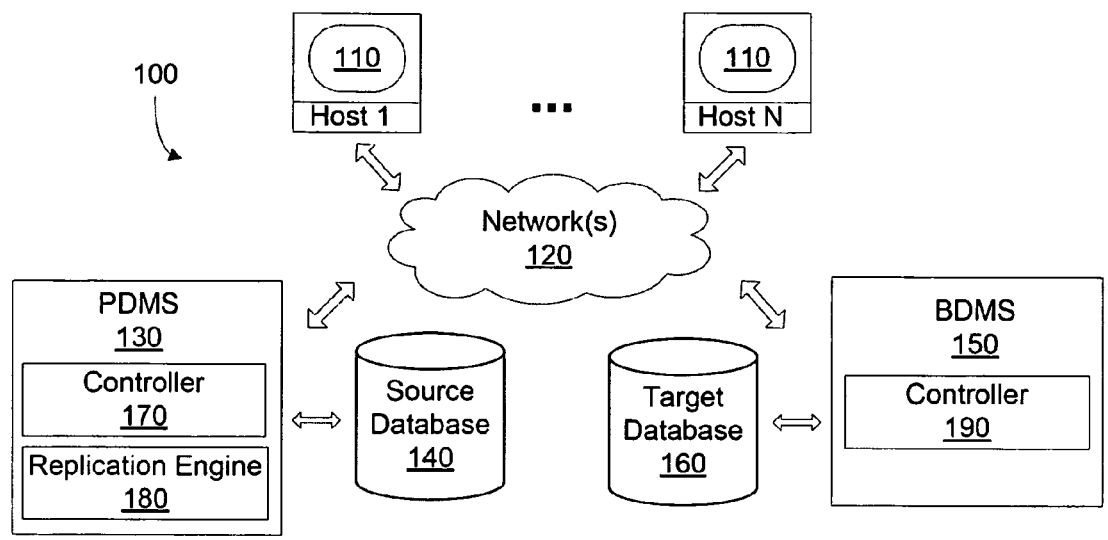
FIG. 1 is a block diagram of an exemplary distributed file or storage system in accordance with an exemplary embodiment of the invention.

Exemplary embodiments in accordance with the invention relate to systems and methods for building a target database that is synchronized with an online source database. Exemplary embodiments create a copy of a large database on a backup system in a replication environment.

The target database (i.e., copy database or backup) is created or built without impacting the continuous availability of data stored in the source or primary database. Furthermore, a copy of the source database is created without taking the source database offline or without creating a fuzzy copy of the source database. Instead, the target database is built while the source database remains online. When the backup is complete, the target database is real-time synchronized with the source database.

While the target database is being created, updates (including inserts and deletes) to records in the source database are applied to both the source database and the target database. As updates to records are received at the source database, these updates are simultaneously made in real-time to both databases so the target database and source database are immediately synchronized with updates when creation of the target database commences. Data remaining on the source database (i.e., data not received as an update after commencement of copying) is backfilled into the target database. As such, transaction logs do not accumulate with exemplary embodiments since information in the transaction logs is immediately provided to the target database while the target database is being created.

Initially, blank copies of all database tables in the source database are created in the target database. Records or journals of all updates in the audit file of the source database are provided to the database tables in the target database. At the same time, additional and previously unmodified records are added to transaction logs as if created by inserts. In one exemplary embodiment, the replication engine is informed or instructed to ignore errors.

In one exemplary embodiment, the replication engine is informed when synchronization starts and stops. In other words, the replication engine is made aware of when synchronization starts and finishes for any given object. Using these start and stop endpoints, the replication engine knows when to begin suppressing errors encountered when applying audit to the target database and when to stop suppressing errors. There are several methods to inform the replication engine that synchronization has started. By way of example, the metadata for the object can be flagged, the individual audit records can be marked, or inter-process messages can be used.

While data is being copied to the target database, exemplary embodiments track the backfilling process. Deletes or updates to rows that do not yet exist are ignored. This situation can occur, for example, if the updater or replication engine is not caught up in a particular part of a table in the target database. Exemplary embodiments ignore these errors to allow the transaction logs or updates to the source database to be immediately entered at the target database. Thus, exemplary embodiments suppress errors generated when updates in the transaction logs are applied to tables in the target database and ignore duplicate errors for inserts of records that already exist in the target database.

FIG. 1 is a block diagram of an exemplary distributed file or storage system 100 in accordance with an exemplary embodiment of the invention. By way of example, the system is a cluster storage network and/or a storage area network (SAN) that includes a plurality of host computers 110 (shown as host 1 to host N) coupled through one or more networks 120 to primary database management system (PDMS) 130 and storage devices and/or source database 140 and a backup database management system (BDMS) 150 and storage devices and/or target database 160. The PDMS 130 includes one or more controllers 170 and a replication engine 180, and the BDMS 150 includes one or more controllers 190.

The hosts may communicate with the primary database management system 130 and use a small computer system interface (SCSI) or other interface/commands over a fiber channel (FC). By way of example, networks 120 include one or more of the Ethernet, fibre channel (FC), serial attached SCSI (SAS), iSCSI, internet, local area network (LAN), wide area network (WAN), public and/or private networks, etc.

In one exemplary embodiment, the controllers 170 and 190 are array controllers and the source and target databases 140 and 160 include one or more disk arrays. For example the disk arrays are network attached devices that provide random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controllers and disk arrays are memory nodes that include one or more servers.

The controller 170 manages various data storage and retrieval operations. For example, controller 170 receives I/O requests or commands from the host computers 110, such as data read requests, data write requests, maintenance requests, etc. and processes the storage and retrieval of data on the multiple disk arrays and/or source database. In one exemplary embodiment, controller 170 is a separate device or may be part of a computer system, such as a server. Additionally, the controller 170 can be located with, proximate, or a great geographical distance from the source database 140 and/or BDMS 150 from each other.

In one exemplary embodiment, the storage devices (i.e., source and target databases 140 and 160) are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one embodiment, storage devices are physically located in a same data center. In another embodiment, the storage devices are located a great geographical distance apart in separate data centers. Further, although only two storage devices are shown, a SAN can include hundreds or thousands of such storage devices.

In one exemplary embodiment, a source database is copied to a target database. The replication engine 180 is used to duplicate data from the source database 140 to the target database 160. Changes to the source database are logged in transaction logs. The replication engine reads the transaction logs and applies the changes to both source and target databases.

Before commencing the copy, the replication engine is instructed to suppress specific errors encountered during the transfer of records from the transaction logs to the target database. The errors, for example, can be generated when the replication engine attempts to update a row or column that does not yet exist in the created target database or when attempting to insert a row that already exists in the created target database. By way of example, assume 10,000 records are being copied from the source database to the target database. After reading the tenth record, the transaction logs provide an update to record number 500. The replication engine will encounter an error when it gets to this record number. This error is ignored since record number 500 is updated according to a change that occurred in the source database while the target database is being copied.

As the replication engine begins to read database files, it creates an insert audit record for each record in the database and places this insert audit record into the audit trails. The database records are read as serial reads, and reading commences with the first record in the database. The replication engine reads the records in the audit trail and transfers the records into the table of the target database. These records are read until the end of the file. Then, the audit trail is marked to show completion of this file. The replication engine continues until all records are read from the source database and applied to the target database. At the end of the reading process, the primary database and the target database are identical and synchronized even while the primary database is online and constantly or continuously changing. The replication engine may encounter an error when applying records to the target database. Such an error occurs when a new record is added and thus appears in the transaction log. Depending upon the order of events, the replication engine may apply the insert due to the insert audit record and subsequently attempt to apply the insert due to the actual insert. Alternately, the replication engine may apply the insert due to the actual insert and subsequently attempt to apply the insert due to the insert audit record. In either case, the first insert to the target database will succeed and the second will be rejected due to being a duplicate. The rejection error is suppressed.

By way of example, there are two situations to be considered. Each situation has two subtypes. Further, for purposes of illustration, a distinction is made between the insert audit generated by an application from the revive-insert and an audit generated by the revive process. The two exemplary situations and subtypes are as follows:

1) The revive-insert audit can be placed in the audit trail before the application generated audit for a particular database record.
2) The application generated audit can be placed into the audit trail before the revive-insert audit.

For each of these situations we need to account for the operation type the application is performing. If the operation is an insert, it will result in one set of behavior, whereas, if it is an update or delete operation it will result in another. The following four scenarios are an exhaustive list of the situations to be considered.

1. The revive-insert audit generated by the reading of the database files can be applied to the target database prior to the attempt to apply the audit generated as the result of an insert to the source database. This situation cannot occur and can be dismissed as impossible. All database changes are written to the transaction logs before the database it updated. Since the application has not yet inserted a record into the database it is impossible for another application to read the data to create a revive-insert audit record. It is also impossible for revive-insert audit to arrive in the transaction logs ahead of the application generated audit.
2. The insert audit generated as the result of an insert to the source database can be applied to the target database prior to the attempt to apply the revive-insert audit generated as the result of reading of the database files. The attempt to apply the insert-audit is rejected as a duplicate and the rejection is ignored.
3. The revive-insert audit generated by the reading of the database files can be applied to the target database prior to the attempt to apply the audit generated as the result of an update or delete to the source database. The audit generated as the result of an update or delete modifies the record in the target database, changing the contents supplied by the revive-insert audit with the corresponding update or delete. This results in normal processing by the replication engine and no error suppression is needed.
4. The audit generated as the result of an update or delete can be applied prior to the attempt to apply the revive-insert audit generated by the read. The audit generated as the result of the update or delete is rejected since the record to which the update or delete applies is not found and the rejection is ignored. Eventually the read and generation of the revive-insert audit will catch up to the previously modified row in the source database.

In one exemplary embodiment, the revive process takes a period of time, during which the primary database remains the active and includes a valid copy of the data while the backup is a partial copy. Exemplary embodiments revive a backup copy of a table by reviving each of the partitions of the table and its associated indexes. Rather than using raw data from disk volumes exemplary embodiments apply the audit from application actions and the revive-insert audit With exemplary embodiments, the functions of the replication engine can be included in a single device (such as shown at reference number 180 in FIG. 1) or multiple, separate devices.

Figure 2:
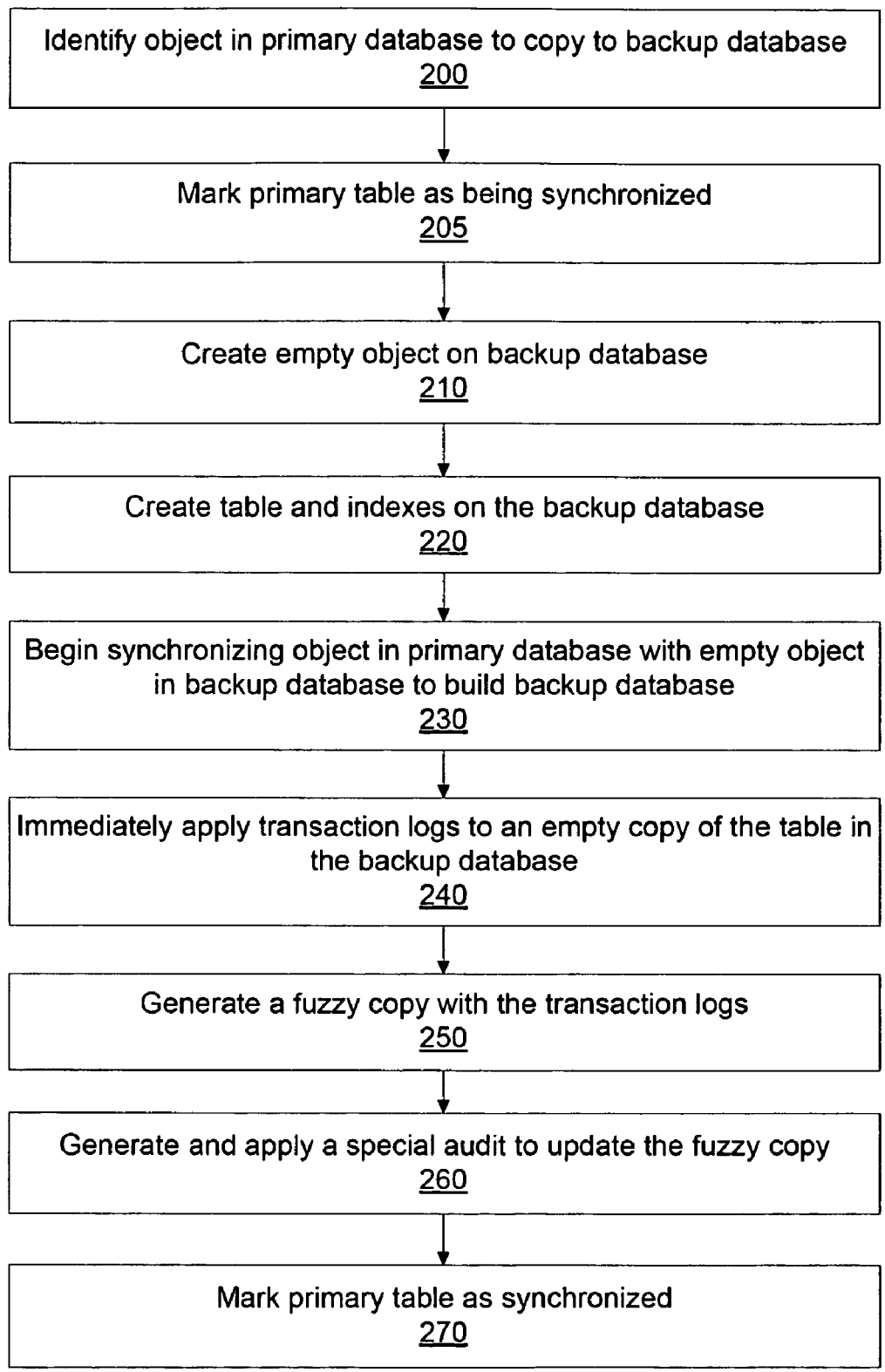
FIG. 2 is a flow diagram for building a target database that is synchronized with an online source database in accordance with an exemplary embodiment.

FIG. 2 is a flow diagram for building a target or backup database that is synchronized with an online source database. In one embodiment, the method synchronizes SQL tables between a source or primary storage device and a destination or target storage device. The method applies changes to an object and a copy of the object to create a backup copy of the original source object.

According to block 200, identify an object in the primary database to copy to the backup or target database. For example, the object can include a single partition or multiple partitions of the source database.

According to block 205, the primary table is marked as being synchronized.

According to block 210, create an empty object on the backup database. The empty object on the backup database is created to store the identified object existing on the primary database.

According to block 220, create a table and indexes on the backup database.

According to block 230, begin synchronizing the identified object in primary database with the empty object in backup database to build the backup database. In one exemplary embodiment, an SQL CREATE statement is executed. Synchronization is initiated as a result of the create statement.

According to block 240, immediately apply transaction logs to an empty copy of the table in the backup database.

According to block 250, a fuzzy copy is generated with the transaction logs.

According to block 260, the fuzzy copy is brought up to date by generating and applying special audit. In one exemplary embodiment, the blocks 240 and 260 occur in parallel.

According to block 270, the primary table is marked as synchronized. When the primary table is marked as synchronized, backup error suppression can be turned off and the tables are in a synchronized state.

Figure 3:
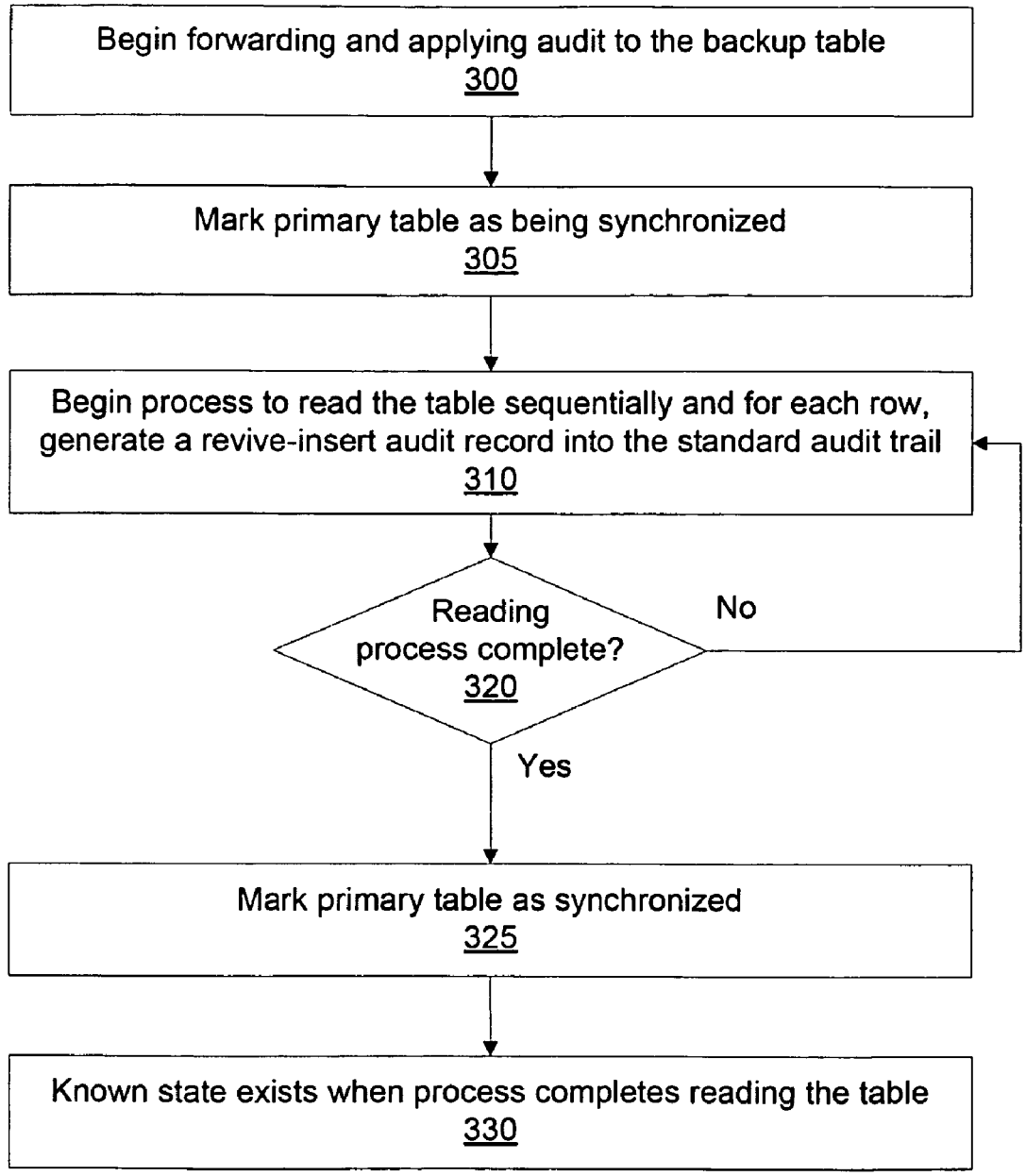
FIG. 3 shows a flow diagram for reading a table into the backup database to arrive at a consistent state between the primary database and the backup database in accordance with an exemplary embodiment.

FIG. 3 shows a flow diagram for reading a table into the backup database to arrive at a consistent state between the primary database and the backup database.

According to block 300, the process begins by forwarding and applying audit to the backup table. Audit is applied to the backup copy of the table and ignores audit containing deletes and updates to rows that do not exist. By throwing away audit containing deletes and updates for rows that do not exist, one embodiment acknowledges that either they do not exist anymore or the reader process will eventually read the correct row.

According to block 305, the primary table is marked as being synchronized so that the updater can suppress errors while applying the audit.

According to block 310, the process begins to read the table sequentially and for each row, generates a revive-insert audit record into the standard transaction log. Audit is applied to the backup copy of the table and is ignored for rows that already exist. By throwing away audit containing revive-inserts that correspond to rows that already exist, one embodiment acknowledges that they were inserted prior to the point when the revive-insert audit was generated.

According to block 320, a question is asked as to whether the reading process is complete. If the process is not complete, then flow proceeds back to block 310 and reading continues. If the process is complete, then flow proceeds to block 325 wherein the primary table is marked as synchronized so the updater can turn off error suppression. By way of example, the table can be marked as being synchronized either with separate audit records, with flags in the audit records, or messages to the replication engine.

According to block 330, a known state exists when the process completes reading the table.

When the process has completed reading the table, we are at a known consistent state.

Figure 4:
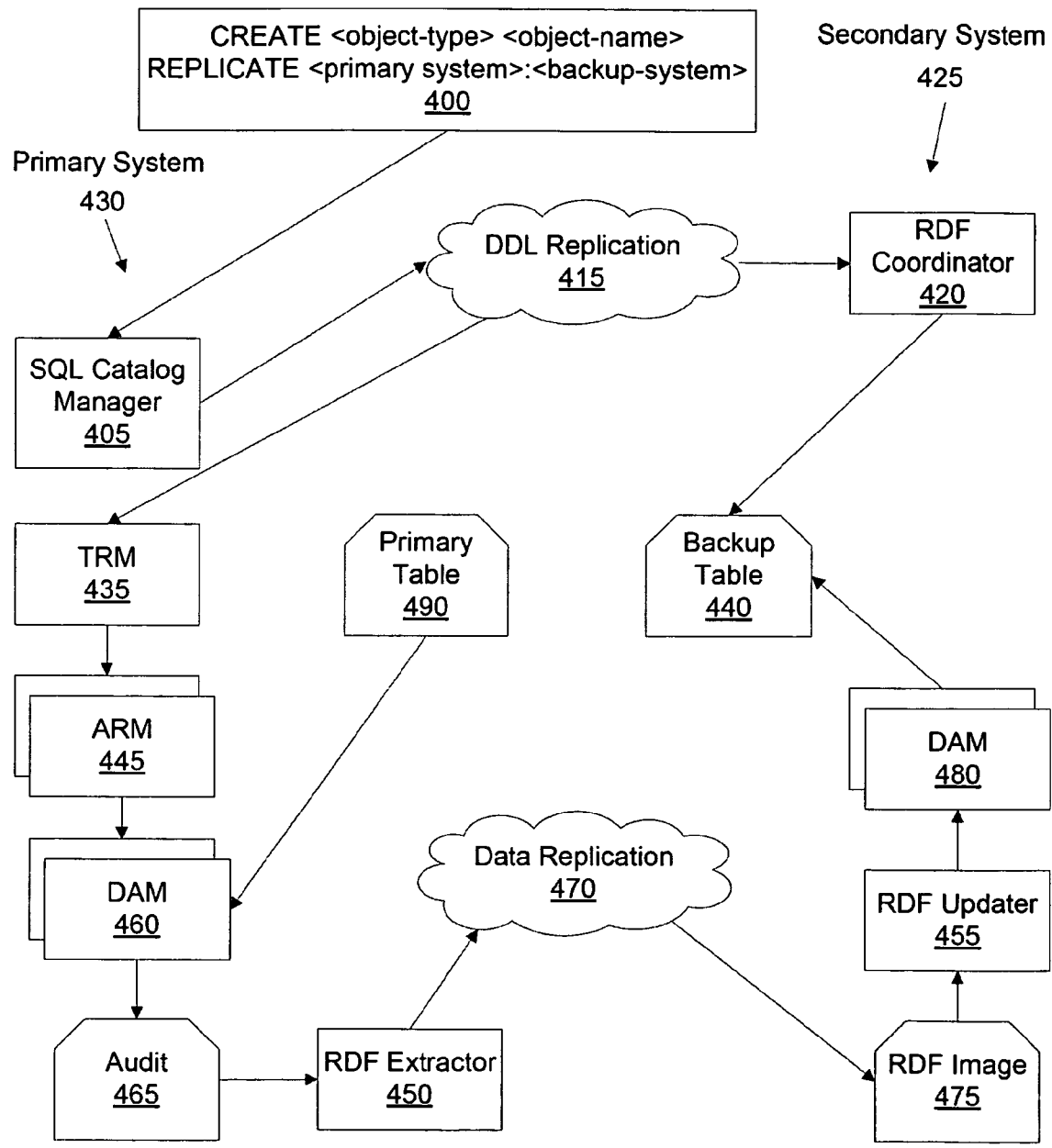
FIG. 4 is a diagram of components for building a target database that is synchronized with an online source database in accordance with an exemplary embodiment.

FIG. 4 is a diagram of components for building a target database that is synchronized with an online source database in accordance with an exemplary embodiment.

The object is initially created as shown in block 400. To synchronize the object that exists on the primary database but does not yet exist on the backup database a new form of the create statement is executed. This new form of create indicates that an object is to be synchronized to a backup system.

The syntax (shown below) is used for example purposes to illustrate the architecture. In one embodiment, the syntax is not directly customer generated but rather output from a tool used to enable replication. An example of the syntax is as follows:

CREATE <object-type> <object-name> REPLICATE <primary system>:<backup-system>.

The SQL Catalog Manager 405 fully qualifies the create DDL statement with any environmental attributes and sends a message to the replication engine which ensures the object is created on the target system. In one embodiment, the Table Revive Manager (TRM) is responsible for creating the target object, but other processes could create the object as well. Once the object is created, the TRM can begin generating revive-insert audit records for replication. The TRM thus handles all CREATE statements in the same manner, independent of whether an object is initially created with replication or the object needs later synchronization.

The CREATE statement 400 is transmitted and executed via the replication engine on the backup system 425. When the CREATE statement completes successfully on the backup, the Table Revive Manager (TRM) 435 begins to synchronize the data. If the Table Revive Manager 435 fails, it is restarted.

In one exemplary embodiment, two programs manage the data synchronization: Table Revive Manager (TRM) 435 and Audit Revive Manager (ARM) 445. The TRM 435 drives the data synchronization process at the table level. The TRM reports progress of the overall synchronization in a form compliant with tools for monitoring and managing databases.

In the metadata for an object, SQL keeps track of the replication state of the object and the replication state of each partition of the object. The replication state is either Created or Synchronized. This state is maintained in order to provide enough state for intelligent restart in the case of failures.

Should an object require re-synchronization, the same general mechanism is used. There is an additional step of removing all data from the target rather than creating the object on the backup system as part of synchronization as shown in the statement below:

```
CREATE <object-type> <object-name> REPLICATE <primary
system>:<backup-system> RESYNCHRONIZE.
```

It is also possible to initiate synchronization or re-synchronization on a partition basis which might be needed during a recovery scenario. Synchronization on a partition basis is shown in the statement below:

```
CREATE <object-type> <object-name> REPLICATE <primary
system>:<backup-system> RESYNCHRONIZE PARTONLY
<partition name>.
```

As shown in FIG. 4, tables and indexes 440 are created on the backup system 425 as part of synchronizing definitions to replicate the primary tables and indexes 490 on the primary system 430. Once the tables and indexes are created, data synchronization can begin.

The ARM 445 drives the data synchronization process at the file level. The Table Revive Manager reports progress of the overall synchronization in a form compliant with the tools for monitoring and managing databases.

In one exemplary embodiment, plural programs are used to implement the data synchronization: RDF Extractor 450, RDF Updater 455, and Data Access Manager (DAM) 460.

The RDF extractor 450 runs on the primary system 430 and forwards audit 465 from the primary system 430, through data replication 470 and RDF image 475 to the RDF updater 475 to the backup system 425. The RDF updater 475 runs on the backup system and sends audit to DAM 480 on the backup system. The DAM 460 on the primary system 430 generates revive-insert audit, and the RDF Updater 455 on the backup system 425 applies audit to the backup copy of tables 440 through the DAM 480.

Conventional approaches take a fuzzy copy of the data and move it to the backup system using backup and restore tools. Subsequently transaction logs are applied to the fuzzy copy to catch up the backup copy with changes that occurred while moving the original fuzzy copy. This approach has several drawbacks. It takes a relatively long time to backup a fuzzy copy, transport the copy to the backup system, and restore the fuzzy copy All transaction logs which are written while the fuzzy copy transfer happens must be saved and require significant disk storage.

Exemplary embodiments solve these drawbacks by immediately applying transaction logs to an empty copy of the table and then using the transaction logs themselves to make a fuzzy copy. The fuzzy copy is brought up to date by generating and applying special audit. Rather than using raw data from disk volumes exemplary embodiments apply the audit from application actions and the revive-insert audit.

Looking to FIG. 4, some of the components of the primary system 430 and backup system 425 are discussed in more detail.

The TRM 435 is responsible for ensuring the replication integrity of an SQL table. Replication integrity for a table means that all the table and index partitions are synchronized. Specifically, the TRM initiates ARM processes 445 for each partition of a table and all associated indexes. They are executed in the same processing node as the DAM 460 for their associated partition.

The ARM processes 445 for each partition are executed in parallel if the bandwidth supports parallel execution. Given sufficient bandwidth, the time to synchronize a table is a function of the biggest partition. One exemplary embodiment revives all the partitions for a table in parallel. Then, each index of the table is revived in succession. The partitions of each index are executed in parallel if the bandwidth supports parallel execution.

The TRM 435 monitors the ARM processes 445 for successful completion and restarts them in case of failure. The TRM is also normally initiated automatically as part of definition synchronization but can also be manually initiated by a database administrator. TRM processes report their progress and status which is provided on a display.

The ARM 445 is responsible for ensuring the replication integrity of a single partition of a SQL table or index. Replication integrity for a partition means that the data in the backup copy of the file matches the data in the primary copy of the file.

The ARM 445 interacts with DAM 460, and indirectly with the RDF Updaters 455. The ARM 445 is launched by the TRM 435 and passed the name of the file to be synchronized. In one embodiment, ARM opens the file and turns-on an Audit-Revive in progress flag.

The DAM 460 generates an audit record which indicates the change in state of data occurring to the primary database. This audit record is used by the RDF extractor 450 and RDF updater 455 to recognize that audit is forwarded and applied as part of synchronization.

In one embodiment, the ARM 445 initiates a request to DAM 460 to begin generating revive-insert audit for rows in the partition. Revive-insert audit is generated in key order within the partition. The starting position in the partition is in the request to DAM. DAM will generate revive-insert audit for a set of rows and respond to the request with the last position for which revive-insert audit was generated. ARM thus re-drives DAM until revive-insert audit has been generated for all rows.

The pacing of re-drive requests to DAM is self-tuned. DAM returns pacing information to the ARM which is used by the ARM to delay the next re-drive. The idea is that under low query loads, more cycles can be spent generating revive-insert audit. The pacing is also dependent upon audit generation for Inserts/Updates and Deletes (I/U/D).

ARM processes report their progress and status which is visible in a display or graphical user interface (GUI).

In the case of processing node failures, ARM processes are restarted. In order to facilitate restart, the ARM reads the Audit-Revive in progress flag and only set the flag if it was reset.

Finally ARM resets the Audit-Revive in progress flag and generates a corresponding audit record. At that point the backup copy of the partition is in synchronization with the primary partition. Specifically, synchronization occurs once the updaters pass the audit record which signals the completion of the synchronization. At that point, the updaters stop suppressing errors and replication resumes normally.

The RDF Extractor 450 uses the Audit-Revive audit record to update the RDF configuration and trigger the forwarding of audit for the specific partition. Without the audit-revive audit record the partition in question would be excluded from forwarding.

One optimization is to have the extractor distinguish between audit generated by applications use of a table and revive-insert audit generated by the actions of the ARM. By extracting position information from ARM generated revive-insert audit, it can toss application caused audit which occurs after the extracted position. In other words, application generated audit with a key value greater than the key read by the ARM is omitted. The idea is to exclude audit records with key values greater than what the ARM is reading and just wait for the ARM generated insert record.

The RDF Updater 455 sends all audit to the appropriate DAM including the audit-revive in progress audit record.

DAM 460 generates insert-audit based on requests from the ARM. DAM also serializes the generation of audit. This means that ACID (Atomicity, Consistency, Isolation, Durability) properties are preserved and there is no contention between ARM initiated audit and audit initiated on behalf of concurrent SQL statements. ACID provides a set of properties to ensure database transactions are reliably processed.

DAM 480 on the backup system 425 applies audit based on requests from the RDF Updater 455. DAM masks undiscovered errors when applying update or delete audit and the table is in the audit-revive in progress state. DAM also masks duplicate-key errors when applying revive-insert audit and the table is in the audit-revive in progress state. Such insert audit may originate from the ARM or from application inserts. Alternately, the RDF Updater can ignore the errors returned by DAM when in the audit revive in progress state.

Revive-Insert Audit generated as a result of the ARM can be ignored by outside of the revive process. One exemplary embodiment sets a flag to note that the audit is only used by the replication engine.

Revive techniques can also be used as a replacement for online dumps. Audit Based Revive basically places the entire table into the transaction log. By keeping the set of transaction logs, a table can be recovered entirely from the transaction logs as they contain the fuzzy copy of the table as well as necessary changes to the table.

Figure 5:
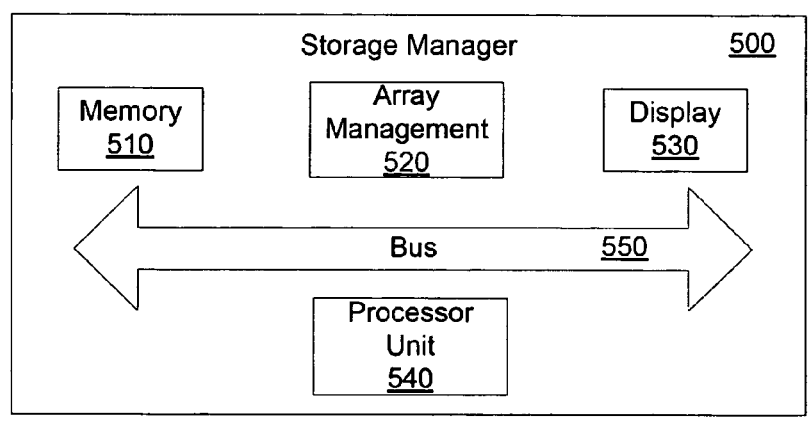
FIG. 5 is a block diagram of a storage manager in accordance with an exemplary embodiment.

FIG. 5 is a block diagram of a storage manager 500 in accordance with an exemplary embodiment of the present invention. In one embodiment, the manager is a computer that includes memory 510, array management software or algorithms 520, display 530, processing unit 540 and one or more buses 550.

In one embodiment, the processor unit includes a processor (such as a central processing unit, CPU, microprocessor, application-specific integrated circuit (ASIC), etc.) for controlling the overall operation of memory 510 (such as random access memory (RAM) for temporary data storage, read only memory (ROM) for permanent data storage, and firmware). The memory 510, for example, stores applications, data, programs, algorithms (including software to implement or assist in implementing embodiments in accordance with the present invention) and other data. The processing unit 540 communicates with memory 510 and display 530 via one or more buses 550.

Definitions

As used herein and in the claims, the following words are defined as follows:

The term "ARM" or "Audit Revive Manager" means a program and/or method for synchronization at a partition database level.

The terms "build" and "building" mean causing to be constructed and brought into existence according to a plan. Building a database means a new database is created, made, or brought into existence. Building a database is different than updating a database, which means bringing an already existing database up to date with new information.

A "database" is a structured collection of records or data that are stored in a computer system so that a computer program or person using a query language can consult it to retrieve records and/or answer queries.

The term "DDL" or "Data Definition Language" means part of the SQL language for defining and managing objects in a database.

The term "DAM" or "Data Access Manager" means a disk process used for file and record management operations. For example, a DAM provides access to SQL tables and indexes partitioned across storage disks.

A "fuzzy copy" of a database contains the contents of the database which was produced by reading the source copy and writing the destination copy over a period of time. The source copy might be modified concurrently. Thus changes to a portion of the source copy are not reflected in the destination copy when the modification to the source happens after the source copy has been read. The fuzzy copy contains portions of the source which were true at some point in time during the copy operation but the resulting destination copy is not consistent at any one point in time. A fuzzy copy contains a snapshot of the data that was on disk at the moment a particular data record was read, but this data must be corrected using the audit logs for the time period when the data copy was being made because some modifications are in flight and not yet committed, while others might be absent from the snapshot. The snapshot is created by repeatedly reading successive portions of the source database and writing each portion in turn to the copy. The data is fuzzy until all transactions that were active at the time the copy started as well as any additional transactions that were started during the copy have been committed/aborted and all their modifications have been applied to the data.

The term "RDF" or "Remote Duplicate Database Facility" means a utility that furnishes database backup by duplicating transactions that occur on one database to an identical copy of that database on another system.

The term "RDBMS" or "Relational Database Management System" means a database management system in which data is stored in tables and the relationship among the data is also stored in tables.

The term "revive-insert audit" means transaction log records for inserts generated specifically to revive the data of an SQL object. The term is contrasted to transaction log records for inserts generated due to application inserts. The format is generally not distinguishable from audit generated as the result of regular application caused inserts.

The term "SQL" or "Structured Query Language" means a database computer language that retrieves and manages data in relational database management systems (RDBMS), manages database object access control, and/or creates and modifies database schema. For example, SQL is a programming language for managing databases and querying and modifying data in the databases.

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

The term "transaction log" means a file of updates performed on a database. The transaction log records the history of actions executed by a database management system. For example, transaction logs are a sequence of audit records that include data about when and/or by whom particular records changed. The transaction logs can also include information about the actual changes that were made sufficient to enable reconstruction of the ends states of data and reconstruction of the intermediate states that the data went through before the final state is established.

The term "TRM" or "Table Revive Manager" is a program and/or method for synchronization at a database table level.

As used herein, the terms primary database and source database are interchangeable. Further, the terms backup database and target database are also interchangeable.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for building a database, comprising:
    selecting objects in a source database to be copied to a backup database;
    beginning to copy the objects to the backup database while the source database remains online;
    receiving updates to the source database while the objects are being copied to the backup database; and
    applying the updates to both the source database and the backup database while the objects are being copied to the backup database.

2. The method for building a database of claim 1 further comprising:
    creating tables in the backup database for the objects;
    immediately applying transaction logs that include the updates to the tables to avoid accumulation of the transaction logs while the objects are being copied to the backup database.

3. The method for building a database of claim 2 further comprising:
    using the transaction logs to make a fuzzy copy;
    generating and applying an audit to bring the fuzzy copy up to date.

4. The method for building a database of claim 1 further comprising:
    applying audit to a backup table created in the backup database;
    ignoring errors caused by the audit having changes to rows that do not exist in the backup table while the objects are being copied to the backup database to allow the updates to the source database to be immediately entered at the backup database.

5. The method for building a database of claim 1 further comprising:
    creating tables in the backup database for the objects;
    ignoring errors occurring from deletes and updates to rows that do not exist in the tables.

6. A tangible computer readable storage medium having instructions for causing a computer to execute a method, comprising:
    building a target database from an online source database;
    receiving updates to the source database while the target database is being built; and
    applying records in transaction logs to the target database while the target database is being built, wherein the records in the transaction logs include both existing data in the source database and the updates that occur to the source database while the target database is being built.

7. The tangible computer readable storage medium of claim 6 further comprising, suppressing errors generated when the updates in the transaction logs are applied to tables in the target database and ignoring duplicate record errors for inserts of records that already exist.

8. The tangible computer readable storage medium of claim 6 further comprising, interleaving the updates in the transaction logs as the updates arrive at the source database.

9. The tangible computer readable storage medium of claim 6 further comprising, continuously updating the target database with changes to records that occur to the source database while the target database is being built so the target and source databases are synchronized.

10. The tangible computer readable storage medium of claim 6 further comprising, synchronizing the updates with both the target database and the source database.

11. A database management system, comprising:
    an online primary database including a storage device and a controller; and
    a replication engine that:
        builds a backup database from the online primary database by transferring transaction logs to a backup system that includes the backup database;
        receives updates to records in the online primary database;

applies the updates simultaneously to both the online primary database and the backup database while the backup database is being built from the online primary database;

wherein the transaction logs include both data existing in the online primary database and the updates received for the online primary database while the backup database is being built.

12. The database management system of claim 11, wherein the replication engine further:

suppresses errors caused by applying the updates to rows that do not exist in the backup database, wherein the replication engine is informed when synchronization between the online primary database and the backup database starts and finishes for any given object so the replication engine knows when to begin suppressing the errors.

13. The database management system of claim 11 further comprising, a table revive manager (TRM) that ensures tables and indexes are synchronized in both the online primary database and backup database.

14. The database management system of claim 11, wherein the replication engine further:

applies audit to a backup table created in the backup database;

ignores deletes and updates to rows that do not exist in the backup table while data is being copied to the backup database to allow the updates to the online primary database to be immediately entered at the backup database.

15. The database management system of claim 11, wherein the replication engine further:

applies audit to a backup table created in the backup database while ignoring audit having deletes and updates for rows that do not exist in the backup table.

16. The database management system of claim 11, wherein the replication engine applies audit to a backup table created in the backup database, and the audit having revive-inserts corresponding to rows in the backup database that already exist is discarded since the revive-inserts were inserted prior to a point when the audit having the revive-inserts was generated.

* * * * *